(12) United States Patent
Maki

(10) Patent No.: US 9,413,915 B2
(45) Date of Patent: Aug. 9, 2016

(54) MONITORING APPARATUS, MONITORING SYSTEM, LOG MANAGEMENT METHOD, AND COMPUTER PROGRAM

(71) Applicant: CANON KABUSHIKI KAISHA, Tokyo (JP)

(72) Inventor: Nobuhiko Maki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 26 days.

(21) Appl. No.: 14/632,960

(22) Filed: Feb. 26, 2015

(65) Prior Publication Data
US 2015/0249765 A1 Sep. 3, 2015

(30) Foreign Application Priority Data

Mar. 3, 2014 (JP) ................................ 2014-040305

(51) Int. Cl.
| | |
|---|---|
| *G06F 15/00* | (2006.01) |
| *G06F 1/00* | (2006.01) |
| *G06K 15/00* | (2006.01) |
| *H04N 1/00* | (2006.01) |
| *H04N 7/18* | (2006.01) |
| *H04N 5/76* | (2006.01) |
| *H04N 1/21* | (2006.01) |
| *H04N 101/00* | (2006.01) |

(52) U.S. Cl.
CPC ....... *H04N 1/00854* (2013.01); *H04N 1/00251* (2013.01); *H04N 1/00832* (2013.01); *H04N 1/00877* (2013.01); *H04N 1/2112* (2013.01); *H04N 5/76* (2013.01); *H04N 7/183* (2013.01); *H04N 2101/00* (2013.01); *H04N 2201/0082* (2013.01); *H04N 2201/0094* (2013.01)

(58) Field of Classification Search
USPC .................................................. 358/1.1–1.18
See application file for complete search history.

(56) References Cited

U.S. PATENT DOCUMENTS

| 2012/0138677 A1* | 6/2012 | Ma et al. ........................ 235/379 |
| 2012/0185933 A1* | 7/2012 | Belk et al. ........................ 726/17 |

FOREIGN PATENT DOCUMENTS

JP 2008-197152 A 8/2008

* cited by examiner

*Primary Examiner* — Douglas Tran
(74) *Attorney, Agent, or Firm* — Canon USA, Inc. IP Division

(57) ABSTRACT

A monitoring apparatus is provided with a monitoring system for preventing users from committing unauthorized use by storing an audit log and video data while reducing the amount of data. The monitoring apparatus includes a MFP and a monitoring camera installed at a position from which it can capture an image of the user operating the MFP. The monitoring camera captures a video image including the user. The MFP determines whether an event occurring in response to an instruction received from the user is a specific event. If the event is the specific event, the MFP stores video data representing a video image captured by the monitoring camera during a period in which the event occurs in association with a log indicating a record of the event.

13 Claims, 6 Drawing Sheets

FIG. 4

| LOG NUMBER 501 | TIME 502 | EVENT TYPE 503 | USER TYPE 504 | USER ID 505 | RESULT 506 | VIDEO DATA 507 |
|---|---|---|---|---|---|---|
| 00100 | 2013/08/01 11:42 | Login | General | User 1 | OK | |
| 00101 | 2013/08/01 11:50 | Logout | General | User 1 | OK | |
| .. | .. | .. | .. | .. | .. | |
| 00120 | 2013/08/01 12:10 | Login | Guest | ― | OK | 00120.mpg |
| 00121 | 2013/08/01 12:20 | Logout | Guest | ― | OK | |
| .. | .. | .. | .. | .. | .. | |
| 00155 | 2013/08/01 13:30 | Login | Admin | User 2 | OK | |
| 00156 | 2013/08/01 13:35 | Logout | Admin | User 2 | OK | |

FIG. 6

| LOG NUMBER 601 | JOB START TIME 602 | JOB END TIME 603 | JOB TYPE 604 | USER TYPE 605 | USER ID 606 | RESULT 607 | VIDEO DATA 608 |
|---|---|---|---|---|---|---|---|
| 01100 | 2013/08/01 11:42 | 2013/08/01 11:42 | Copy | General | User 1 | OK | |
| 01101 | 2013/08/01 11:50 | 2013/08/01 11:50 | Print | General | User 1 | OK | |
| .. | .. | .. | .. | .. | .. | .. | |
| 01120 | 2013/08/01 12:10 | 2013/08/01 12:10 | FAX Send | General | ---- | OK | 01120.mpg |
| .. | .. | .. | .. | .. | .. | .. | |
| 01155 | 2013/08/01 13:30 | 2013/08/01 12:10 | E-mail Send | Guest | User 2 | OK | 01155.mpg |
| 01156 | 2013/08/01 13:35 | 2013/08/01 12:20 | Copy | Guest | User 2 | OK | |

MONITORING APPARATUS, MONITORING SYSTEM, LOG MANAGEMENT METHOD, AND COMPUTER PROGRAM

BACKGROUND OF THE INVENTION

1. Field of the Invention

The present invention relates to monitoring apparatuses for preventing unauthorized use of image forming apparatuses such as copying machines and multifunctional peripherals by users.

2. Description of the Related Art

There are image forming apparatuses capable of performing various jobs such as copying, network printing, facsimile communication, and e-mail transmission. Some of the image forming apparatuses have a function of storing various event logs such as registered user authentication logs, operation logs, and job logs. The logs are collectively referred to sometimes as "audit log." An audit log is recorded together with user identification information (hereinafter, "user ID") on the user having ordered an event. The audit log specifies records of user operations and works as a psychological deterrent to unauthorized use by users to discourage the users from committing such use.

To prevent unauthorized use, capturing images by a monitoring camera is also effective. Some monitoring cameras sequentially store video data representing captured video images on a recording server communicably connected via a network. Japanese Patent Application Laid-Open No. 2008-197152 discusses a technique using a combination of an image forming apparatus and a monitoring camera to prevent unauthorized use. According to the technique discussed in Japanese Patent Application Laid-Open No. 2008-197152, video data representing a video image of the user that is captured by the monitoring camera from the start to the end of a job is associated with the job and managed by the image forming apparatus.

Image forming apparatuses used in offices are generally set to allow guest users to use the image forming apparatuses. Allowing a user not registered in an image forming apparatus to use the apparatus as a guest user enables, for example, a guest or a user of another department to use limited functions. The monitoring log is stored only for the users that logged in. Thus, in a case where a user uses the image forming apparatus as a guest user, it is not possible to identify the user from the audit log.

Further, according to Japanese Patent Application Laid-Open No. 2008-197152, users including guest users can be identified from the video images for each job. However, since the video images are managed for every job, the amount of video data increases. Thus, it takes time to extract a target video image and identify the user having executed the job.

SUMMARY OF THE INVENTION

The present invention is directed to providing monitoring apparatuses configured to store an audit log and video data while reducing the amount of data, thereby preventing unauthorized use by users.

According to an aspect of the present invention, a monitoring apparatus includes an operation unit configured to receive an instruction from a user, a determination unit configured to determine whether an event having occurred in response to the instruction is a specific event, and a log management unit configured to, in a case where the event is the specific event, stores video data in association with a log indicating a record of the event, the video data representing a video image captured during a period in which the event occurs by an image capturing apparatus positioned to capture an image of the user.

Further features of the present invention will become apparent from the following description of exemplary embodiments with reference to the attached drawings.

BRIEF DESCRIPTION OF THE DRAWINGS

FIG. 4 illustrates an example of an audit log.

FIG. 6 illustrates an example of an audit log.

DESCRIPTION OF THE EMBODIMENTS

The following describes exemplary embodiments in detail with reference to the drawings.

Figure 1:
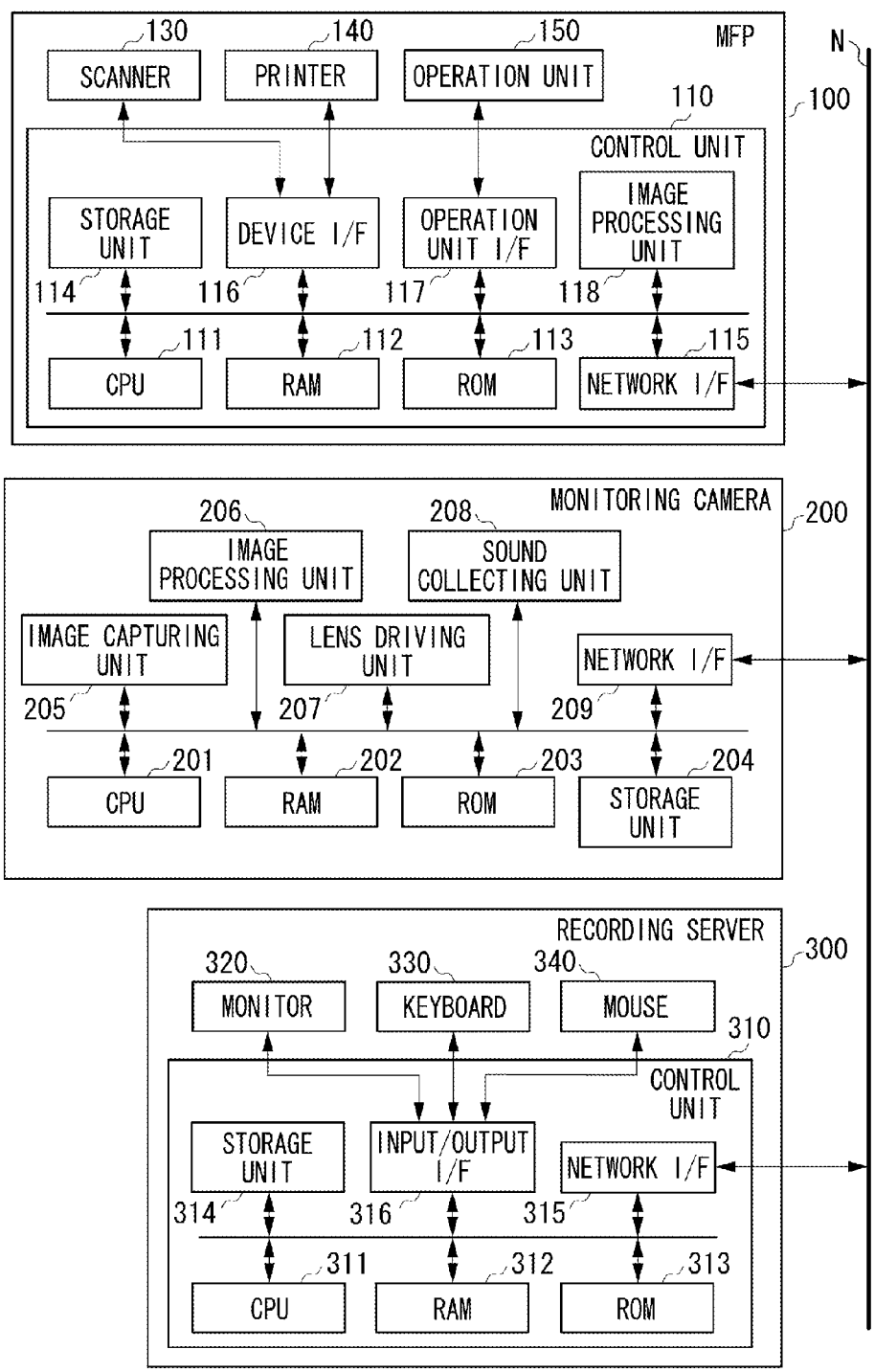
FIG. 1 illustrates the entire configuration of a monitoring system.

FIG. 1 illustrates the entire configuration of a monitoring system including a monitoring apparatus according to the present exemplary embodiments. The monitoring system includes a multifunction peripheral (MFP) 100, which is one example of the image forming apparatus, a monitoring camera 200, which is an image capturing apparatus, and a recording server 300. All of them are communicably connected to one another via a network N. The monitoring apparatus is included in the MFP 100. The network N is a communication network such as a local area network (LAN), a wide area network (WAN), or the Internet.

The MFP 100 includes a control unit 110, a scanner 130, a printer 140, and an operation unit 150. The control unit 110 controls the operations of the scanner 130, which is an image input device, the printer 140, which is an image output device, and the operation unit 150, which is a user interface. The operation unit 150 includes, for example, a touch panel, and a display section and an input section of the operation unit 150 are integrally formed. The control unit 110 and the operation unit 150 form the monitoring apparatus.

The operation unit 150 receives various user instructions. In a case of performing copying, in response to a copy instruction from the operation unit 150, the control unit 110 instructs the printer 140 to perform printing based on image data of a document scanned by the scanner 130. The control unit 110 is connected to the network N, and instructs the printer 140 to perform the printing based on image data input from an external device via the network N in the execution of a print job.

The control unit 110 includes a central processing unit (CPU) 111, a random-access memory (RAM) 112, a read-only memory (ROM) 113, and a storage unit 114. The CPU 111 controls the operations of the entire MFP 100 by executing a system boot program stored in the ROM 113 and a computer program stored in the storage unit 114 by use of the RAM 112 as a work area. The storage unit 114 stores data such as image data to be used to form images, user data registered in the MFP 100, an audit log showing records of events that have occurred, and video data representing a video image captured by the monitoring camera 200, as well as the computer programs. The control unit 110 stores the audit log and the video data in the storage unit 114 to manage the log of events that have occurred in the MFP 100.

The control unit 110 further includes a network interface (I/F) 115, a device I/F 116, an operation unit I/F 117, and an image processing unit 118. The network I/F 115 is connected to the network N and controls communication with external devices connected to the network N. The device I/F 116 is connected to the scanner 130 and the printer 140 and performs synchronous/asynchronous conversion of image data. The operation unit I/F 117 is connected to the operation unit 150 and outputs to the operation unit 150 display data to be displayed on the operation unit 150. Further, the operation unit I/F 117 receives user instructions given via the operation unit 150 and sends the user instructions to the CPU 111. The image processing unit 118 performs image correction on image data received via the network N or input/output from the device I/F 116.

The monitoring camera 200 is a video camera capable of capturing moving images. The monitoring camera 200 is installed to image the vicinity of the MFP 100. For example, the monitoring camera 200 is installed at a position from which the monitoring camera 200 can capture images of a user operating the MFP 100. The monitoring camera 200 captures video images including the user. The operations of the monitoring camera 200 are controlled by a CPU 201. The CPU 201 controls the operations of the entire monitoring camera 200 by executing a system boot program stored in a ROM 203 and a computer program stored in a storage unit 204 by use of a RAM 202 as a work area.

An image capturing unit 205 generates video data corresponding to light input via a camera lens (not illustrated). An image processing unit 206 performs image correction on video data generated by the image capturing unit 205. A lens driving unit 207 controls the operations of the camera lens such as panning, tilting, and zooming under the control by the CPU 201. Information indicating a state after the operations of the lens driving unit 207 is stored in the storage unit 204. A sound collecting unit 208 generates sound data based on sound input from a microphone (not illustrated). A network I/F 209 is connected to the network N and controls communication with an external device connected to the network N. In the present exemplary embodiments, the network I/F 209 is used to send video data to the recording server 300.

The recording server 300 is a general-purpose server including a control unit 310, a monitor 320, a keyboard 330, and a mouse 340. The recording server 300 stores video data of video images captured by the monitoring camera 200.

The control unit 310 includes a CPU 311, a RAM 312, a ROM 313, and a storage unit 314. The CPU 311 controls the operations of the entire recording server 300 by executing a system boot program stored in the ROM 313 and a computer program stored in the storage unit 314 by use of the RAM 312 as a work area. The storage unit 314 sequentially stores video data sent from the monitoring camera 200.

The control unit 310 further includes a network I/F 315 and an input/output I/F 316. The network I/F 315 is connected to the network N and controls communication with an external device connected to the network N. The input/output I/F 316 controls communication with the monitor 320, which is an output device, and communication with the keyboard 330 and the mouse 340, both of which are input devices.

In the foregoing monitoring system, video images of a user using the MFP 100 are captured by the monitoring camera 200. Video data representing a video image captured by the monitoring camera 200 is sequentially stored in the recording server 300. The MFP 100 has a function of, in a case where a specific event occurs, acquiring from the recording server 300 video data of the period during which the specific event occurs and storing the acquired video data. The following describes a process to be executed by the MFP 100 in a case where the specific event is login or logoff by a specific user (first exemplary embodiment) and a process to be executed by the MFP 100 in a case where the specific event is raised by a specific job (second exemplary embodiment).

The following describes the first exemplary embodiment.

Figure 2:
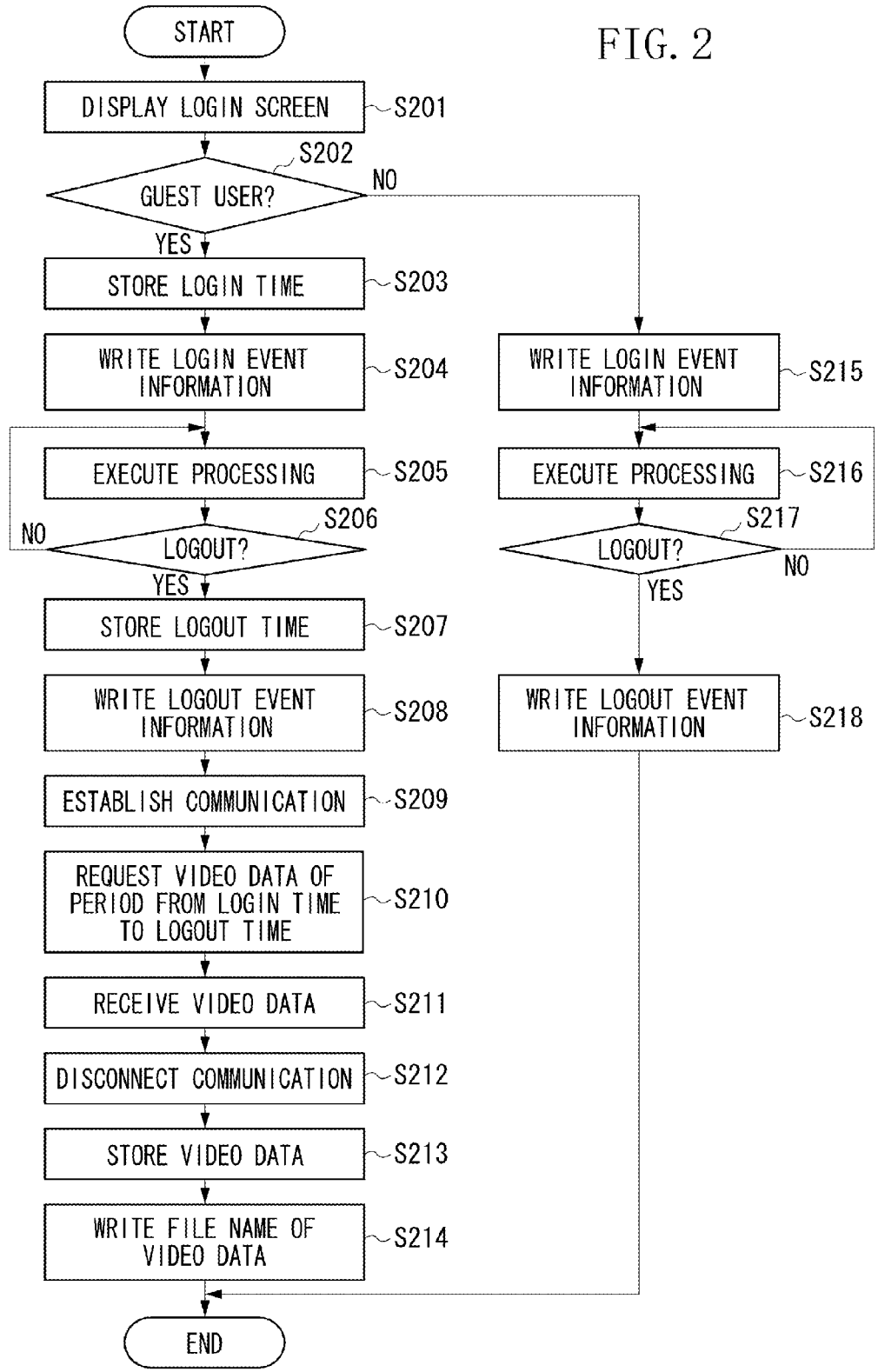
FIG. 2 is a flow chart illustrating a process from login to logout.

FIG. 2 is a flow chart illustrating a process from login to logout to or from the MFP 100 by a user. The MFP 100 stores an audit log of a period from login to logout by a specific user together with video data captured by the monitoring camera 200 during the period.

Figure 3:
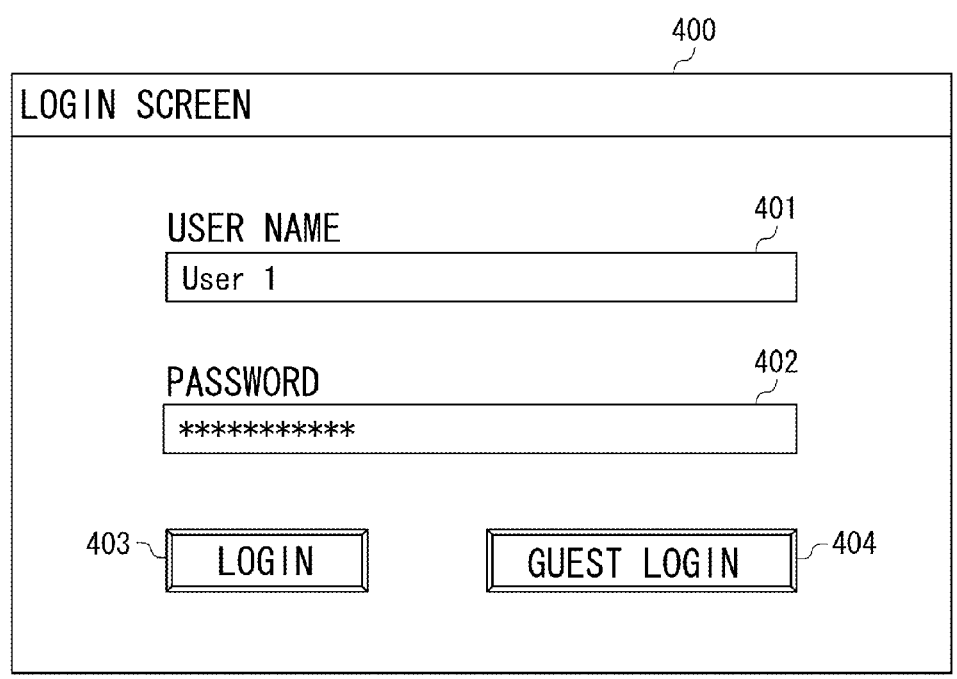
FIG. 3 illustrates an example of a login screen.

In step S201, when the MFP 100 is activated, the control unit 110 of the MFP 100 displays a login screen on the display section of the operation unit 150. The MFP 100 displays the login screen to accept user login. FIG. 3 illustrates an example of the login screen. The login screen includes a user name input area 401, a password input area 402, a login button 403, and a guest login button 404. A user registered in the MFP 100 can log in by inputting a user name into the user name input area 401 and a password into the password input area 402 and then pressing the login button 403. A user not registered in the MFP 100 can log in by pressing the guest login button 404. The operation unit 150 receives an instruction indicating a registered user when the login button 403 is pressed and a guest user when the guest login button 404 is pressed.

In step S202, when the user logs in from the login screen, the control unit 110 of the MFP 100 determines whether the logged in user is a guest user. The control unit 110 determines whether the user is a guest user based on whether the guest login button 404 is pressed to log in.

If the logged in user is a guest user (YES in step S202), then in step S203, the control unit 110 of the MFP 100 temporarily stores the login time in the RAM 112. In step S204, after storing the login time in the RAM 112, the control unit 110 writes login event information to an audit log stored in the storage unit 114. Further, the control unit 110 temporarily stores the log number of the written login event information in the RAM 112.

FIG. 4 illustrates an example of the audit log. Each log record of the audit log includes a log number field 501, a time field 502, an event type field 503, a user type field 504, a user ID field 505, a result field 506, and a video data field 507. The foregoing fields are mere examples, and the fields of the audit log are not limited to them.

The log number field 501 stores a log number uniquely assigned to the log record. The time field 502 stores the time at which an event such as login or logout occurred. The event type field 503 stores the event type such as login or logout. The user type field 504 stores information about whether the logged in user is an administrator (Admin), a general user (General), or a guest user (Guest). The administrator and the general user are users registered in the MFP 100. The user ID field 505 stores a user ID of the logged in user. A user ID is assigned to each user registered in the MFP 100, and the user ID field 505 stores the user ID. The result field 506 stores a result indicating whether an event such as login or logout is successfully done. The video data field 507 stores a file name of video data corresponding to the log record. The video data field 507 may store identification information from which the video data can be identified, as well as the file name of the video data.

The control unit 110 stores in the RAM 112 the log number read from the log number field 501 in step S204. In the example in FIG. 4, the log record of the log number "00120" is stored in the RAM 112. In step S204, the control unit 110 writes information of the audit log in the log number field 501, the time field 502, the event type field 503, the user type field 504, the user ID field 505, and the result field 506. The control unit 110 writes the time stored in step S203 in the time field 502, the login event in the event type field 503, and the guest user (Guest) in the user type field 504. Since the user ID cannot be identified when the logged in user is a guest user, the control unit 110 writes "- - - -" in the user ID field 505. At this time, the control unit 110 writes nothing in the video data field 507.

In step S205, the control unit 110 executes processing ordered by the user via the operation unit 150. Examples of processing to be ordered by the user via the operation unit 150 include copying, printing, facsimile transmission, and a change of settings. If the user gives a logout instruction (YES in step S206), then in step S207, the control unit 110 temporarily stores the logout time in the RAM 112.

In step S208, the control unit 110 writes logout event information to the audit log in the storage unit 114. When the guest user logs out, the control unit 110 writes to the audit log the logout event information such as the log record of the log number "00121" in FIG. 4. In step S209, after writing the logout event information, the control unit 110 establishes communication with the recording server 300 via the network I/F 115.

In step S210, after establishing communication with the recording server 300, the control unit 110 sends a request to the recording server 300 for video data of the period from the login time to the logout time stored in the RAM 112. The control unit 110 sends to the recording server 300, for example, a request for video data of the period including the login time and the logout time. The recording server 300 sequentially stores in the storage unit 314 video data captured by the monitoring camera 200. The recording server 300 extracts from the storage unit 314 the video data of the period corresponding to the request from the MFP 100 and sends the extracted video data to the MFP 100.

In step S211, the control unit 110 of the MFP 100 receives the video data sent from the recording server 300. In step S212, after receiving the video data, the control unit 110 of the MFP 100 disconnects the communication with the recording server 300. In step S213, the control unit 110 stores the received video data in the storage unit 114. The control unit 110 uses as the file name of the video data to be stored a file name related to the log number of the log event information written in step S204. In the example in FIG. 4, the file name of the video data is "00120.mpg."

In step S214, the control unit 110 of the MFP 100 writes the file name of the video data stored in the storage unit 114 in the video data field 507 of the log record corresponding to the log number stored in the RAM 112 in step S204. In the example in FIG. 4, "00120.mpg" is written. As the foregoing describes, in the case where the logged in user is a guest user, the control unit 110 stores video data from the login to the logout, writes the file name of each video data to the audit log to associate the audit log with the video data, stores the video data and the audit log, and ends the processing. Thereafter, the control unit 110 displays the login screen again on the display section of the operation unit 150.

On the other hand, if the logged in user is not a guest user (NO in step S202), then in step S215, the control unit 110 of the MFP 100 determines that a general user or an administrator has logged in and writes login event information to the audit log in the storage unit 114. For example, in the case where a general user logs in, the control unit 110 writes login event information as illustrated in the log record of the log number "00100" in FIG. 4. Unlike the case of a guest user, the control unit 110 does not have to store the log number of the written login event information in the RAM 112.

In step S216, after writing the login event information, the control unit 110 of the MFP 100 executes the processing ordered by the user via the operation unit 150. If the user gives an instruction to log out (YES in step S217), then in step S218, the control unit 110 writes logout information to the audit log in the storage unit 114. For example, in the case where a general user is to log out, the control unit 110 writes logout event information to the log record of the log number "00101" in FIG. 4. If the logged in user is not a guest user, the processing is ended as described above. Thereafter, the control unit 110 displays the login screen again on the display section of the operation unit 150.

In the first exemplary embodiment described above, even in the case where a guest user uses the MFP 100, the guest user can be identified with ease by checking the video data associated with the audit log. This not only identifies a user having committed unauthorized use but also increases the psychological deterrent to discourage the users from committing unauthorized use. Furthermore, since only the video data of the guest users is stored, the amount of video data stored in the MFP 100 can be reduced.

While video data of the period from the login to the logout is stored in the first exemplary embodiment, video data of the period from the start to the end of processing executed in response to an instruction from a guest user may be stored instead. In this case, video data is not stored during a period other than when the processing is executed, whereby the information amount of video data stored in the MFP 100 can further be reduced. Further, to enable the user to designate via the operation unit 150 a period of video data to be stored, for example, a setting item for the designation may be included in the login screen.

While whether to store video data is determined based on whether the logged in user is a guest user in the first exemplary embodiment, whether to store video data may also be determined based on whether the user is an administrator. In a case where an administrator logs in, video data is stored. An administrator is a privileged user allowed to refer to and change the settings of the MFP 100 and various data stored in the MFP 100. Hence, a person may masquerade as an administrator to commit unauthorized use of the MFP 100, so there is a security risk. Thus, in the case where an administrator operates the MFP 100, video data is stored in association with the audit log, whereby a person having committed unauthorized use can be identified from the video data.

The following describes the second exemplary embodiment. In the second exemplary embodiment, whether to store video data is determined based on the type of a job ordered by a user. The MFP 100 stores the video data in association with an audit log of an event generated by a specific job.

Figure 5:
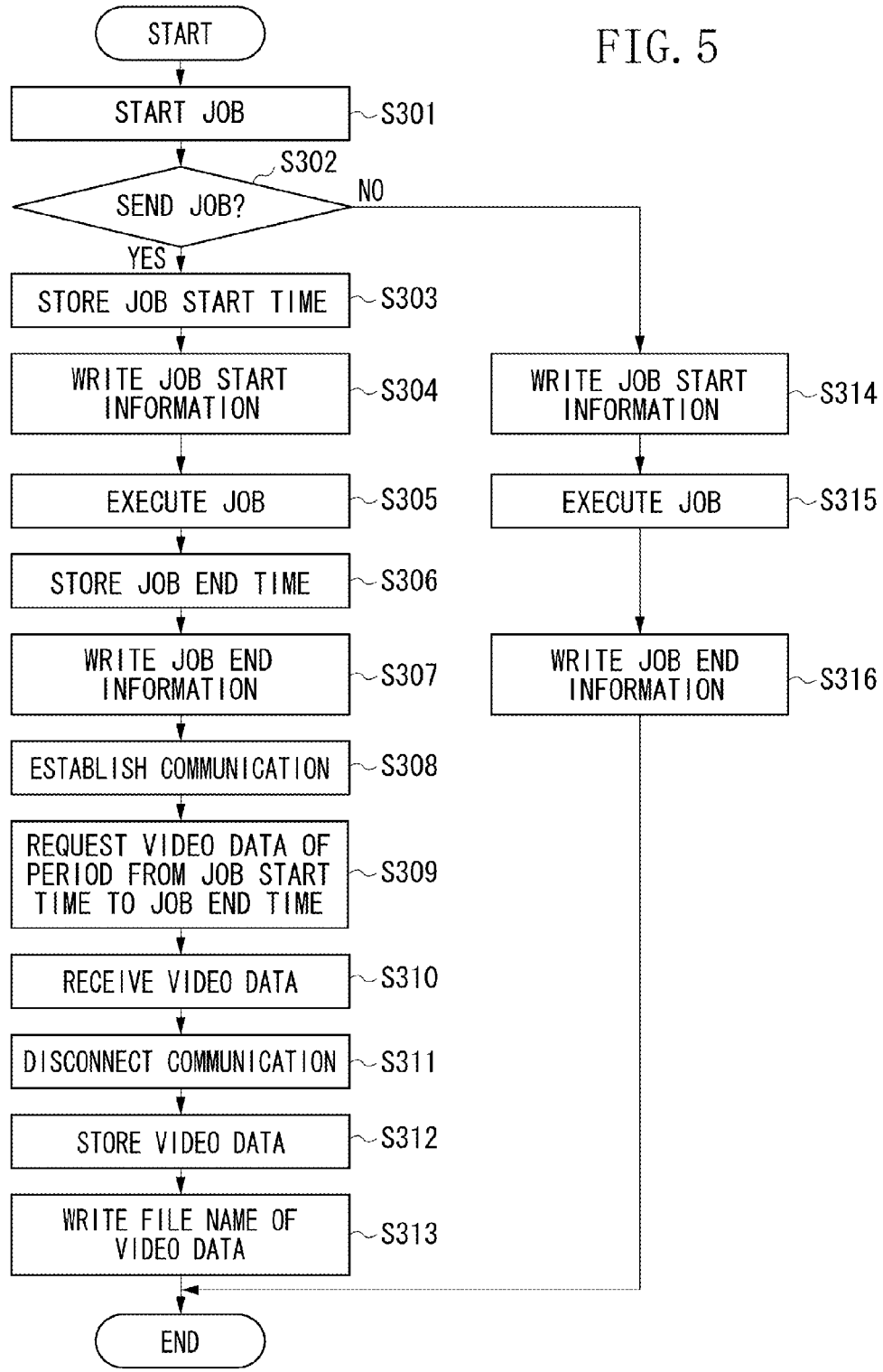
FIG. 5 is a flow chart illustrating a process of storing an audit log according to the type of a job.

FIG. 5 is a flow chart illustrating a process of storing an audit log corresponding to the type of a job. The MFP 100 receives a job execution instruction from the operation unit 150 or an external device connected via the network N. The job execution instruction contains the user type and user ID of the user having given the instruction. In step S301, the control unit 110 of the MFP 100 receives a job execution instruction to start the ordered job. In step S302, the control unit 110 determines the type of the started job. In this step, the control unit 110 determines whether the started job involves transmission processing such as facsimile transmission or e-mail transmission (hereinafter, the job will be referred to as "send job").

If the started job is a send job (YES in step S302), then in step S303, the control unit 110 temporarily stores the job start time in the RAM 112. In step S304, after storing the job start time in the RAM 112, the control unit 110 writes job start information about the started job to the audit log. Further, the control unit 110 temporarily stores in the RAM 112 the log number of the written job start information.

FIG. 6 illustrates an example of the audit log. As shown in the audit log (refer to FIG. 4) according to the first exemplary embodiment, each log record of the audit log includes a log number field 601, a user type field 605, a user ID field 606, a result field 607, and a video data field 608. The audit log in FIG. 6 further includes a job start time field 602, a job end time field 603, and a job type field 604. The foregoing fields are mere examples, and the fields of the audit log are not limited to the foregoing fields.

The log number field 601 stores a log number uniquely assigned to the log record. The job start time field 602 stores the job start time. The job end time field 603 stores the job end time. The job type field 604 stores the job type (copying (Copy), printing (Print), facsimile transmission (FAX Send), e-mail transmission (E-mail Send), etc.). The user type field 605 stores information about whether the user having given the job execution instruction is an administrator (Admin), a general user (General), or a guest user (Guest). The user ID field 606 stores the user ID of the user having given the job execution instruction. The result field 607 stores a job execution result. The video data field 608 stores the file name of video data corresponding to the log record.

In a case where the started job is facsimile transmission, the control unit 110 writes, for example, the log record of the log number "01120" to the audit log. In step S304, the control unit 110 writes information of the audit log in the log number field 601, the job start time field 602, the job type field 604, the user type field 605, and the user ID field 606. The control unit 110 writes the time stored in step S303 in the job start time field 602 and "FAX Send" indicating facsimile transmission in the job type field 604. The control unit 110 writes the user type contained in the job execution instruction in the user type field 605, and the user ID in the user ID field 606. In the case where the user is a guest user, the control unit 110 writes "- - - -" in the user ID field 606. At this time, the control unit 110 writes nothing in the job end time field 603, the result field 607, or the video data field 608.

In step S305, the control unit 110 of the MFP 100 executes all ordered jobs. In step S306, when all jobs are completed, the control unit 110 temporarily stores the time of completion (job end time) in the RAM 112. In step S307, the control unit 110 writes job end information indicating that the job has been ended in the audit log. The job end information contains the job end time and job result. Based on the job end information, the control unit 110 writes the job end time and job result respectively in the job end time field 603 and the result field 607 of the log record of the log number ("01120" in this case) which is stored in the RAM 112 in step S304. In step S308, after writing the job end information, the control unit 110 establishes communication with the recording server 300 via the network I/F 115.

In step S309, after establishing communication with the recording server 300, the control unit 110 sends a request to the recording server 300 for video data of the period from the job start time to the job end time stored in the RAM 112. The control unit 110 sends to the recording server 300, for example, a request for video data of the period including the job start time and the job end time. The recording server 300 sequentially stores in the storage unit 314 video data captured by the monitoring camera 200. The recording server 300 extracts from the storage unit 314 the video data of the period corresponding to the request from the MFP 100 and sends the extracted video data to the MFP 100.

In step S310, the control unit 110 of the MFP 100 receives the video data sent from the recording server 300. In step S311, after receiving the video data, the control unit 110 of the MFP 100 disconnects the communication with the recording server 300. In step S312, the control unit 110 stores the received video data in the storage unit 114. The control unit 110 uses as the file name of the video data to be stored a file name related to the log number stored in step S304. In the example in FIG. 6, the file name of the video data is "01120.mpg."

In step S313, the control unit 110 of the MFP 100 writes the file name of the video data stored in the storage unit 114 in the video data field 608 of the log record corresponding to the log number stored in the RAM 112 in step S304. In the example in FIG. 6, "01120.mpg" is written. As the foregoing describes, in the case where the job to be executed is a send job, the control unit 110 stores the video data from the start to the end of the job, writes the file name of the video data to the audit log to associate the audit log with the video data, and ends the processing.

On the other hand, if the started job is not a send job (NO in step S302), then in step S314, the control unit 110 of the MFP 100 determines that a copy job, a print job, or the like has been started, and the control unit 110 writes job start information to the audit log in the storage unit 114. At this time, the control unit 110 temporarily stores in the RAM 112 the log number of the written job start information. For example, in the case where the started job is a copy job, the control unit 110 writes job start information as shown in the log record of the log number "01100" in FIG. 6. The fields in which the control unit 110 writes in step S314 are the same as those in step S304, and the control unit 110 writes "Copy" indicating a copy job in the job type field 604.

In step S315, after writing the job start information, the control unit 110 of the MFP 100 executes all ordered jobs. In step S316, when all ordered jobs are completed, the control unit 110 writes job end information indicating that the job has been ended to the audit log. The job end information contains the job end time and the job result. Based on the job end information, the control unit 110 writes the job end time and the job result respectively in the job end time field 603 and the result field 607 of the log record of the log number ("01100" in this case) stored in the RAM 112 in step S314. When the writing of the job end information is completed as described above, the control unit 110 ends the processing for the case where the job to be executed is not a send job.

As the foregoing describes, according to the second exemplary embodiment, whether to store video data is determined based on the type of a job to be executed. Video data is stored in the case where the job to be executed is a send job. Since a send job can send a document and the like externally, there is a possibility of information leakage. In such a case, the user can be reliably identified by use of the video data in combination with the audit log.

The first and second exemplary embodiments may be combined to execute the processing. For example, video data may be stored only in a case where a guest user orders a specific job such as a send job. Other conditions for storing video data may also be added. Further, a selection screen may be provided to enable a user to select via the operation unit 150 conditions for storing video data. The period of video data to be stored may be limited depending on a selected condition. This produces an effect of reducing the amount of data stored in the MFP 100.

Further, while the MFP 100 is configured to acquire video data from the recording server 300 in the first and second exemplary embodiments, the MFP 100 may be configured to acquire video data directly from the monitoring camera 200.

In this case, the MFP 100 receives video data in real time from the monitoring camera 200 and stores only video data of a necessary period.

As the foregoing describes, the MFP 100 stores video data only in association with an audit log of a specific event. This makes it unnecessary to search a significant amount of video data captured by the monitoring camera 200 to retrieve a target video image portion afterward. Further, video data is stored only in limited cases where a specific event occurs, whereby the memory consumption in the MFP 100 can be reduced. Even if the person who used the MFP 100 cannot be identified from the audit log, the person can be identified from the corresponding video data.

According to each of the foregoing exemplary embodiments, logs and video data are stored in a specific event, whereby unauthorized use by the users can be prevented while the amount of data is reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-040305 filed Mar. 3, 2014, which is hereby incorporated by reference herein in its entirety.

What is claimed is:

1. A monitoring apparatus comprising:
an operation unit configured to receive an instruction from a user;
a determination unit configured to determine whether an event having occurred in response to the instruction is a specific event; and
a log management unit configured to, in a case where the event is the specific event, store video data in association with a log indicating a record of the event, the video data representing a video image captured during a period in which the event occurs, by an image capturing apparatus positioned to capture an image of the user.

2. The monitoring apparatus according to claim 1, wherein the log management unit stores video data representing a video image including the user captured by the image capturing apparatus.

3. The monitoring apparatus according to claim 1, wherein the determination unit determines as the specific event an event having occurred in response to an instruction from a specific user.

4. The monitoring apparatus according to claim 3, wherein the operation unit receives from the user an instruction indicating that the user is the specific user, and
wherein based on the instruction received by the operation unit, which indicates that the user is the specific user, the determination unit determines that an event having occurred is the specific event.

5. The monitoring apparatus according to claim 4, wherein the operation unit receives from the user an instruction indicating that the user is a guest user or an administrator, and
wherein based on the instruction indicating that the user is a guest user or an administrator, the determination unit determines that an event having occurred is the specific event.

6. The monitoring apparatus according to claim 1, wherein the determination unit determines as the specific event an event generated by a specific job executed in response to the instruction.

7. The monitoring apparatus according to claim 6, wherein the determination unit determines as the specific event an event generated by a job involving transmission processing and executed in response to the instruction.

8. The monitoring apparatus according to claim 1, wherein in a case where the event is not the specific event, the log management unit stores a log indicating a record of the event.

9. A monitoring system comprising:
an image forming apparatus; and
an image capturing apparatus positioned to capture an image of a user operating the image forming apparatus, the image capturing apparatus configured to capture a video image including the user,
wherein the image forming apparatus includes:
an operation unit configured to receive an instruction from a user;
a determination unit configured to determine whether an event having occurred in response to the instruction is a specific event; and
a log management unit configured to, in a case where the event is the specific event, store video data in association with a log indicating a record of the event, the video data representing a video image captured by the image capturing apparatus during a period in which the event occurs.

10. The monitoring system according to claim 9, further comprising a recording server configured to sequentially store video data representing a video image captured by the image capturing apparatus,
wherein the log management unit acquires from the recording server the video data representing the video image captured during the period in which the specific event occurs.

11. The monitoring system according to claim 10, wherein the log management unit requests the recording server to send the video data of the period during which the specific event occurs, and wherein the recording server extracts the video data of the period, from the stored video data in response to the request and sends the extracted video data to the log management unit.

12. A log management method to be executed by a system including:
   an image forming apparatus; and
   an image capturing apparatus positioned to capture an image of a user operating the image forming apparatus, the image capturing apparatus configured to capture a video image including the user,
   wherein the image forming apparatus determines whether an event occurring in response to an instruction received from the user is a specific event, and
   wherein in a case where the event is the specific event, the image forming apparatus stores video data representing a video image captured by the image capturing apparatus during a period in which the event occurs, in association with a log indicating a record of the event.

13. A non-transitory computer-readable storage medium storing a computer program for causing a computer to function as:
   an operation unit configured to receive an instruction from a user;
   a determination unit configured to determine whether an event occurring in response to the instruction is a specific event; and
   a log management unit configured to, in a case where the event is the specific event, store video data representing a video image captured during a period in which the event occurs by an image capturing apparatus positioned to capture an image of the user, with a log indicating a record of the event.

* * * * *